(12) United States Patent
Liu et al.

(10) Patent No.: US 10,485,252 B2
(45) Date of Patent: Nov. 26, 2019

(54) DISPENSING MECHANISM FOR POPCORN POPPER

(71) Applicant: Greenfield World Trade, Inc., Fort Lauderdale, FL (US)

(72) Inventors: Rong Liu, Vernon Hills, IL (US); Li Peixiong, Guangzhou (CN)

(73) Assignee: GREENFIELD WORLD TRADE, INC., Fort Lauderdale, FL (US)

(*) Notice: Subject to any disclaimer, the term of this patent is extended or adjusted under 35 U.S.C. 154(b) by 652 days.

(21) Appl. No.: 15/204,051

(22) Filed: Jul. 7, 2016

(65) Prior Publication Data

US 2018/0007939 A1    Jan. 11, 2018

(51) Int. Cl.
*A23L 7/187* (2016.01)
*A47J 36/00* (2006.01)
*A47J 37/00* (2006.01)

(52) U.S. Cl.
CPC .............. *A23L 7/187* (2016.08); *A47J 36/00* (2013.01); *A47J 37/00* (2013.01); *A23V 2002/00* (2013.01)

(58) Field of Classification Search
CPC ... A23L 7/187; A23L 1/1812; A23V 2002/00; A47J 36/00; A47J 37/00
USPC ........................................................ 99/323.9
See application file for complete search history.

(56) References Cited

U.S. PATENT DOCUMENTS

| 5,419,238 | A | * | 5/1995 | Pinone | G07F 17/0078 99/323.6 |
|---|---|---|---|---|---|
| 5,501,139 | A | * | 3/1996 | Lee | A23L 7/187 99/323.5 |
| 6,187,353 | B1 | * | 2/2001 | Wyman | G07F 17/0078 426/233 |
| 2014/0102312 | A1 | * | 4/2014 | Korin | A23L 7/183 99/323.9 |
| 2015/0257419 | A1 | * | 9/2015 | Mastroianni | A23L 7/183 99/323.11 |

* cited by examiner

*Primary Examiner* — Dana Ross
*Assistant Examiner* — Joseph W Iskra
(74) *Attorney, Agent, or Firm* — Michael E. Dockins; Shumaker, Loop & Kendrick, LLP

(57) ABSTRACT

The popcorn popper has an on-board storage compartment for storing un-popped kernels of corn. The un-popped kernels of corn may be directed from the storage compartment to cooking surfaces via a dispenser. The dispenser provides a desired serving size of kernels and includes a mechanism to prevent overfeeding of the popper.

20 Claims, 6 Drawing Sheets

DISPENSING MECHANISM FOR POPCORN POPPER

BACKGROUND AND SUMMARY

This disclosure is directed to hot air popcorn poppers. The popcorn popper has an on-board storage compartment for storing un-popped kernels of corn. The un-popped kernels of corn may be directed from the storage compartment to cooking surfaces via a dispenser. The dispenser provides a desired serving size of kernels and includes a mechanism to prevent overfeeding of the popper.

DETAILED DESCRIPTION

Figure 1:
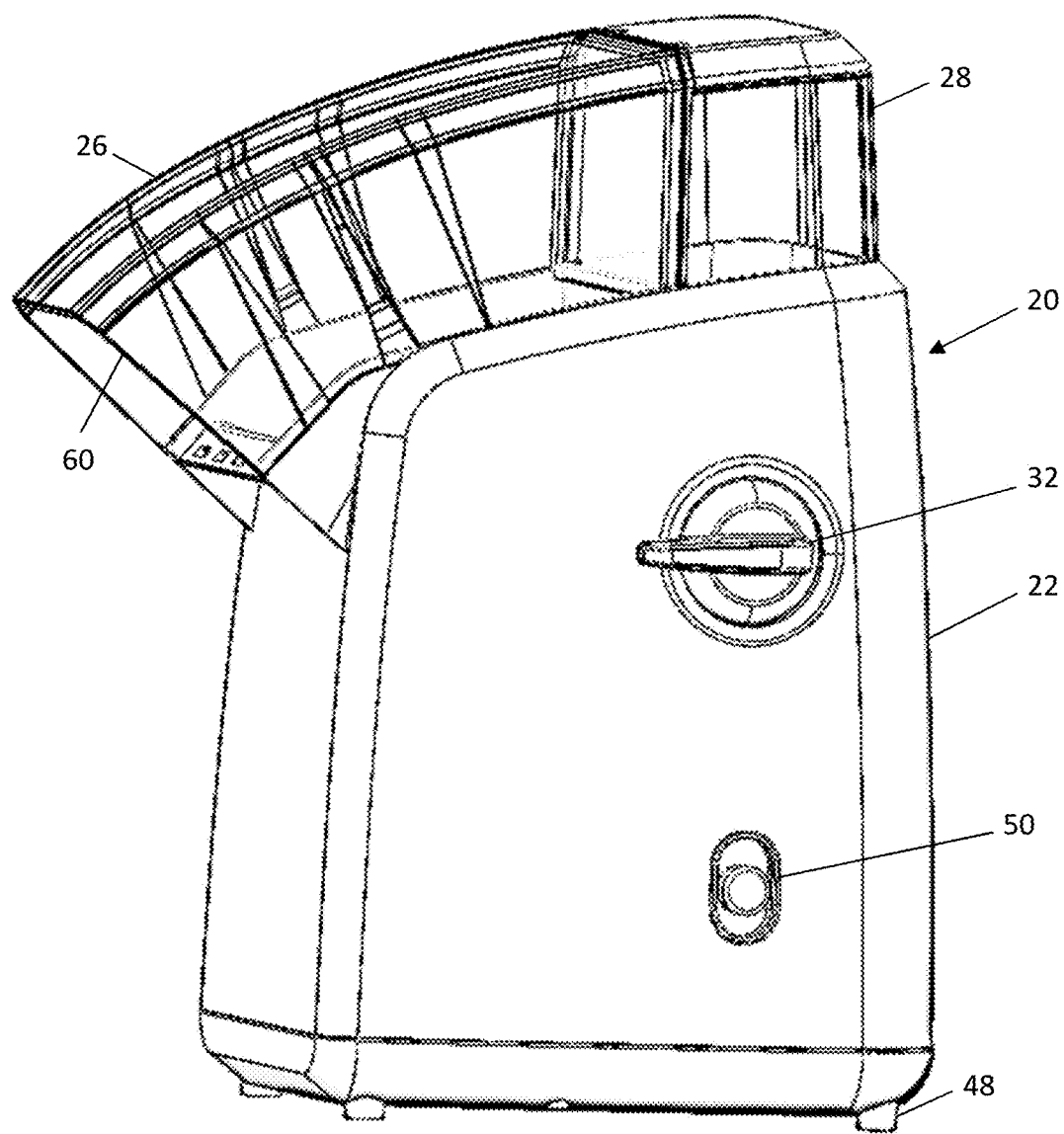
FIG. 1 is a perspective view of the popping unit.

FIG. 1 illustrates a perspective view of a popping unit 20. The popping unit 20 comprises a housing 22 that houses internal components of the popping unit as will be described later in reference to FIG. 2. The popping unit 20 has a popping chamber 24 which may be arranged within the housing 22. A hood assembly 26 may be positioned at an open top end of the popping chamber and releasably connected therewith and/or the housing 22. A storage compartment 28 for un-popped kernels may be arranged exterior to the housing. A dispenser assembly 30 may direct un-popped kernels from the storage compartment to cooking surfaces of the popping unit. A dispenser assembly 30 includes a lever 32 external to the housing 22 that allows the user to feed un-popped kernels from the storage compartment to cooking surfaces of popping unit. As will be described below, the dispenser assembly 30 includes a mechanism to prevent the overfeeding of un-popped kernels of corn into the popping unit.

Figure 2:
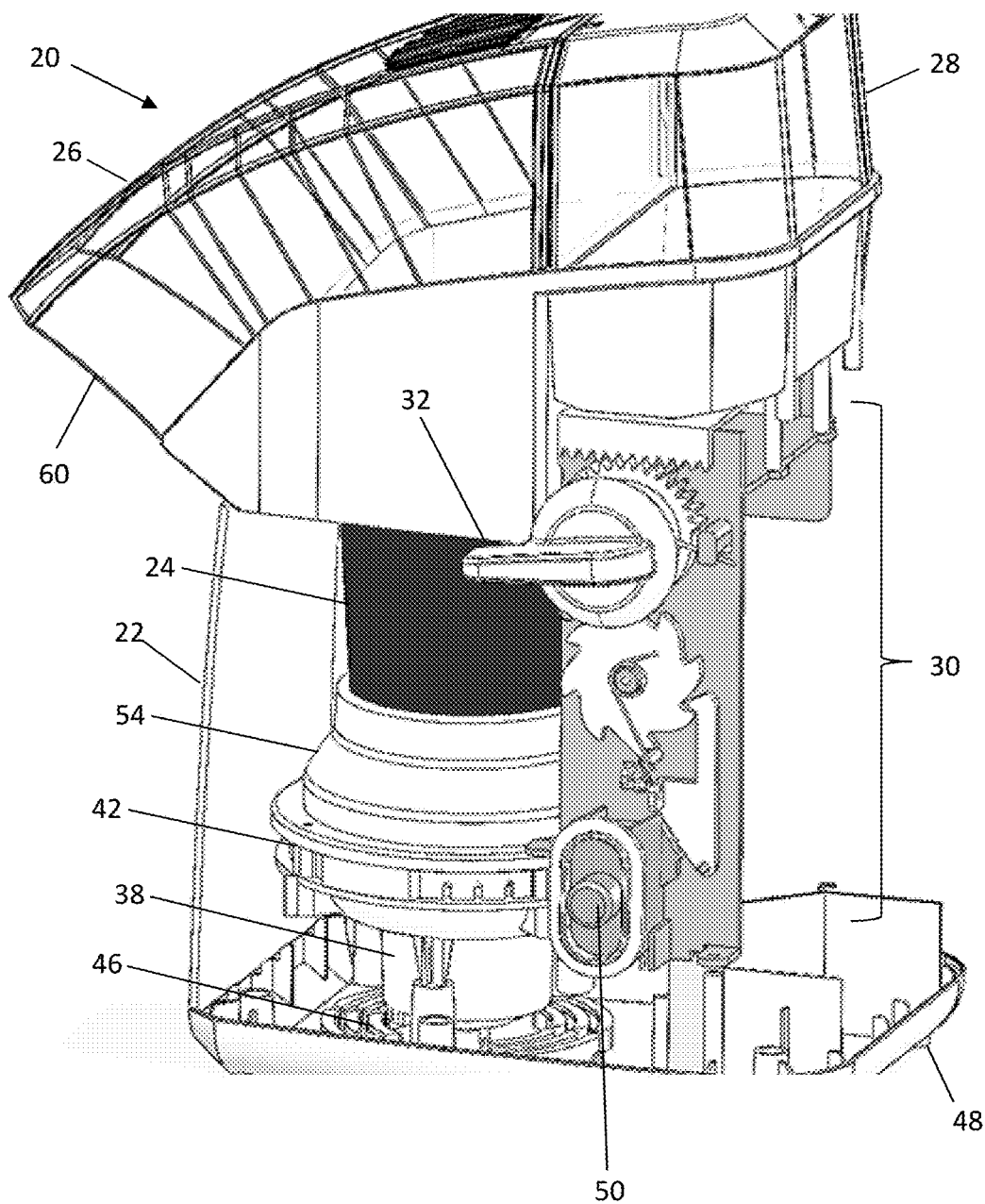
FIG. 2 is a perspective view of the popping unit of FIG. 1 with a portion of a housing removed to show internal components of the popping unit.

FIG. 2 shows a perspective view of the popping unit 20 with a portion of a housing 22 removed to show internal components of the popping unit. In FIG. 2, a bottom and left side portion of the housing 22 is shown. The housing 22 of the popping unit defines a generally hollow interior. A blower fan assembly 38 and a heating element 42 may be disposed in the hollow interior. Through the action of the blower fan 38, ambient air may be drawn into the hollow interior through openings 46 in the housing. The openings 46 may be formed on a bottom of the housing. The bottom of the housing 22 may be raised off a countertop or support surface by feet 48 to allow adequate air to be drawn into the housing interior. The blower fan and/or heating element may be battery powered or powered from a DC power source or external AC power source and/or with a power cord (not shown). The blower fan and/or heating element may be de-energized with a switch located (FIG. 1; '50') on the housing. In the alternative, the switch may be located on the power cord. The switch may be manual or operated via a timer. A plenum 54 located in an upper part of the housing interior may direct the heated air to a cooking grate 56 and/or cooking surfaces 58 after passing over the heating element. In the upper part of the housing interior, the cooking grate 56 and/or the cooking surface 58 may be provided. Un-popped kernels may be placed on the cooking surface and or grate. The grate may be surrounded with a cooking surface. The cooking surface may comprise a frustra-conical shape with the grate extending across the bottom cooking surface. Un-popped kernels may slide down the cooking surface to the grate. The hot air may exit the plenum and circulate around the cooking surface and pass through the grate, thereby heating the kernels and enabling the kernels to pop. Once the kernels pop, the kernels may expand upward into the popping chamber 24 from the cooking grate and/or cooking surfaces. The pressurized, heated air may flow through the popping chamber to the hood assembly 26 and out through an opening 60 in the hood assembly. The pressurized and heated air may push popped kernels away from the cooking grate and cooking surface into the popping chamber, thereby allowing other un-popped kernels to be positioned on the cooking surface and cooking grate. The heated air has sufficient pressure and velocity to push the popped kernels through the popping chamber and out through the hood assembly into a serving dispenser (not shown) during normal popping operations, as will be described in greater detail below. The hood assembly 26 may be detachably connected to the open top end of the popping chamber 24. The hood assembly 26 may be formed from a plastic material. The hood assembly may snap across the open top of the popping chamber or may be rotatably connected to the popping chamber at the open top.

The seed storage compartment 28 of the popping unit may be located on the exterior of the popping unit to facilitate filling of the storage compartment and to allow visualization of the level of kernels stored in the compartment. The storage compartment 28 may be located opposite the opening 60 of the hood assembly 26 as shown in the drawings. The storage compartment may be formed from a clear plastic material to allow the user to visualize the level of seeds stored in the storage compartment. The storage compartment may also be located in the hollow interior of the housing and may have a sight glass to indicate the level of kernels in the storage compartment.

The dispenser assembly 30 may be arranged under the storage compartment 28. The dispenser assembly 30 may comprise a drawer 68. The drawer may have a bottom opening 70 and a top panel 72 with an opening 74 through the top panel. The drawer 68 may translate within a frame 76 (in a horizontal direction relative to the drawings) between a receiving position and a dispensing position. In the receiving position, the drawer 68 may be positioned in the frame 76 in a manner such that the drawer top opening 74 is aligned in register with the storage compartment 28 so that seeds stored in the storage compartment may fall under gravity through the drawer top opening into the drawer. In the receiving position, the drawer bottom opening 70 is blocked by the drawer frame 76 so seed are contained within the drawer 68. In the dispensing position, the drawer 68 may be positioned out of the frame 76 and into the popping chamber 24. The drawer bottom opening 70 may be placed into communication with the popping chamber 24 so that kernels of un-popped corn contained in the drawer fall under gravity into the popper chamber 24 and/or onto the cooking surfaces 58 including the grate 56. In the dispensing position, the drawer top opening 74 is moved away from the storage compartment 28 and the top panel 72 blocks the kernels stored in the storage compartment from flowing into the drawer 68 so the seeds are contained within the storage compartment.

The amount of kernels to be introduced to the cooking surface 58 and cooking grate 56 may equate to the volume of the drawer 68. The volume of the drawer 68 may be sized to accommodate a serving size for an individual. To accommodate additional individuals or the increased appetite of the user, the drawer may be repositioned between the receiving and dispensing positions several times. However, it may be desired to limit the number of cycles that the drawer may be repositioned between the receiving and dispensing positions so as to limit the amount of un-popped kernels that may be introduced into the popping unit for cooking in accordance with the size of the cooking surfaces, including the cooking grate, the desired cycle time, and the capacity of the blower unit and heating element. To maintain the popping unit's ability to effectively pop uncooked kernels, the dispensing mechanism may be configured to prevent overfeeding of the popping unit, as will be described below.

Figure 3:
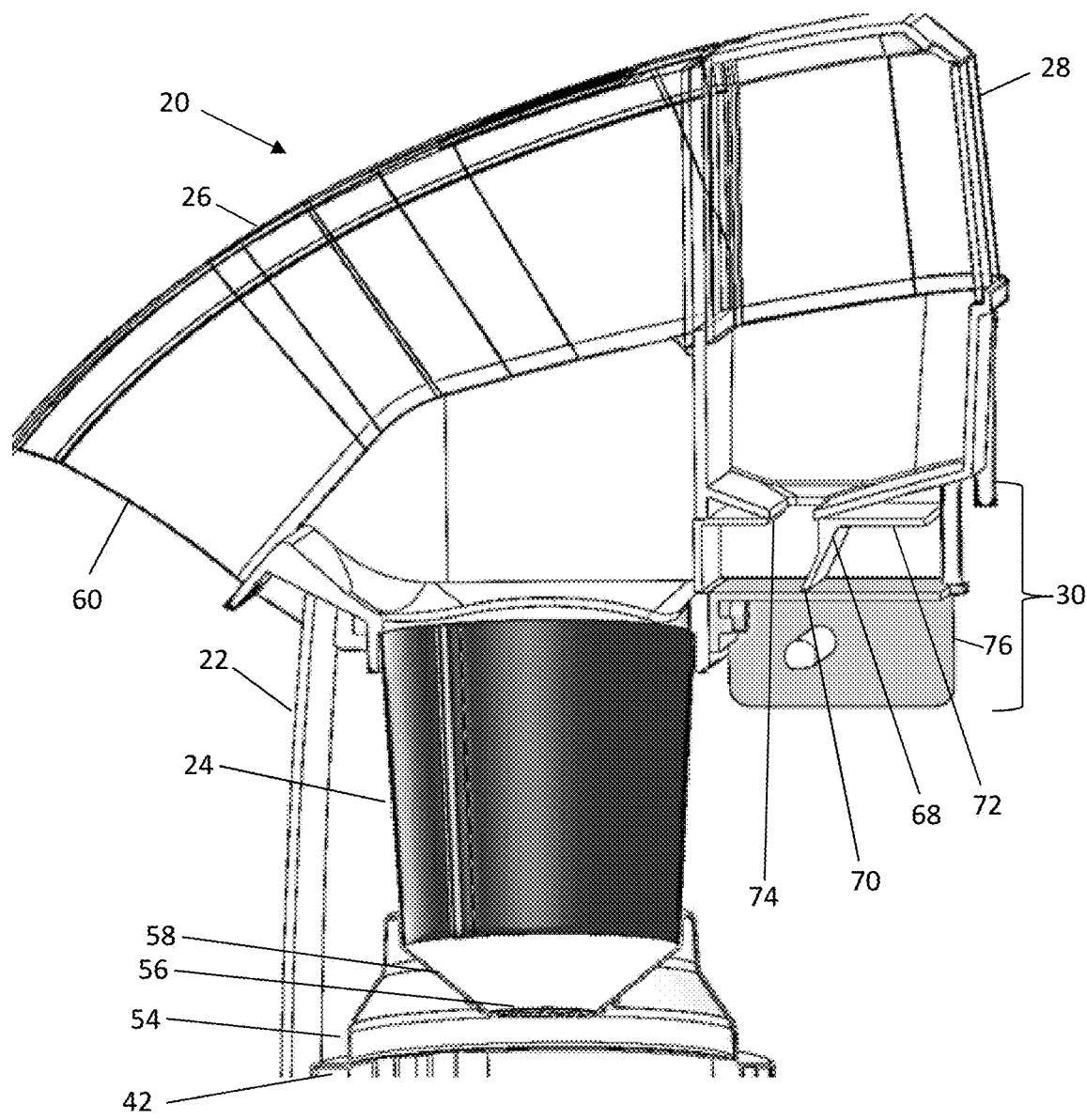
FIG. 3 is a partial side elevation view of an embodiment of a dispenser assembly.

FIGS. 2-5 show an embodiment of the dispensing assembly 30 comprising a mechanism for preventing overfeeding of the popping unit. The dispenser assembly 30 includes the drawer 68, which may have a gear rack 78 depending from the top panel outboard of the frame 76, for instance, as shown in FIG. 3. A driver 80 may be rotatably connected to the frame 76 below the drawer 68, for instance, as show in FIG. 4. The driver 80 may have gear teeth 82 configured to intermesh with the drawer gear rack 78. The driver 80 may be pivotally connected to the frame 76 via an axle 84 that rotates with the driver. The lever arm or knob 32 may be connected to the axle 84. The lever or knob and/or the housing adjacent to the lever may have indicia representative of the receiving and dispensing positions. The lever or knob may include mechanisms to make audible sounds representative of the receiving and dispensing positions. The user may operate the lever or knob 32 to rotate the axle 84 which in turn rotates the driver 80 and affects horizontal translation of the drawer 68 in the frame 76 between the receiving position and the dispensing position. A spring 86 may be coupled between the driver 80 and the frame 76 so as to urge the driver to move the drawer 68 to the receiving position. As shown in the drawings, a torsion spring 86 is provided around the axle 84 so as to bias the driver into clockwise rotation as shown in the drawings, thereby urging the drawer 68 to the receiving position (right in the drawings).

The driver 80 may include a follower 88. The follower 88 may be pivotally connected to the driver 80 and act as a ratchet mechanism, as will be described below. The follower 88 may engage a stop 90 formed on the driver. A spring 92 located on the driver 80 may urge the follower 88 against the stop 90 of the driver. As shown in the drawings, the driver 80 has a side face with a raised surface and an arcuate cutout 94. The follower 88 is pivotally connected to the driver 80 within the arcuate cutout 94. The raised surface and arcuate cutout forms the stop 90 against which the follower 88 engages. The follower 88 may rotate within the arcuate cutout 94 between an extended position in which the follower 88 depends from the driver 80 and is positioned against the stop 90 and a retracted position in which the follower rotates within the arcuate cutout so as to approximate the diameter of the driver. The torsion spring 92 provided on the driver 80 may urge the follower 88 against the stop 90 and into the extended position.

Figure 4:
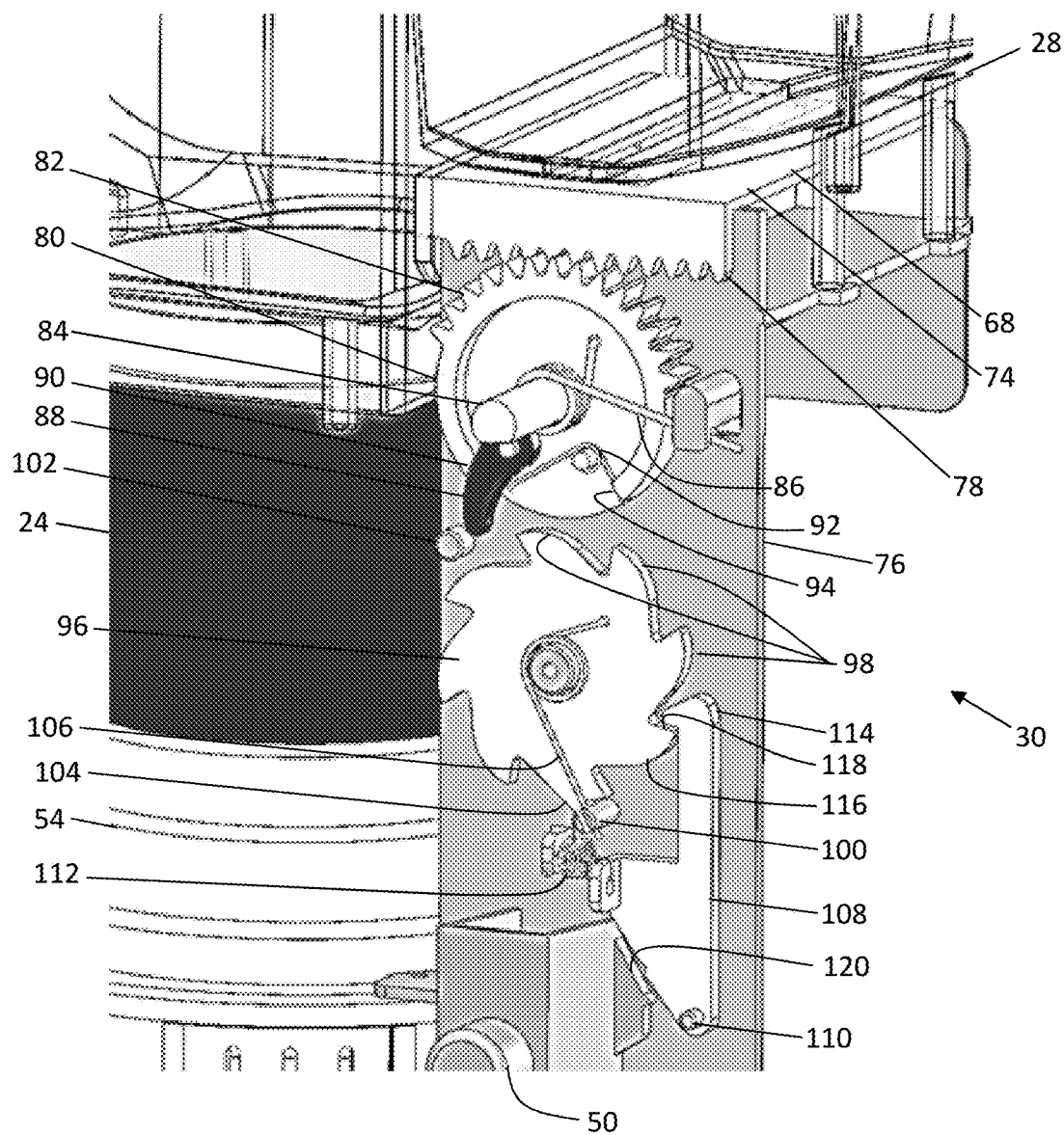
FIG. 4 is a partial side perspective view of the popping unit with a portion of the housing removed to show internal components of the dispensing assembly.
Figure 5:
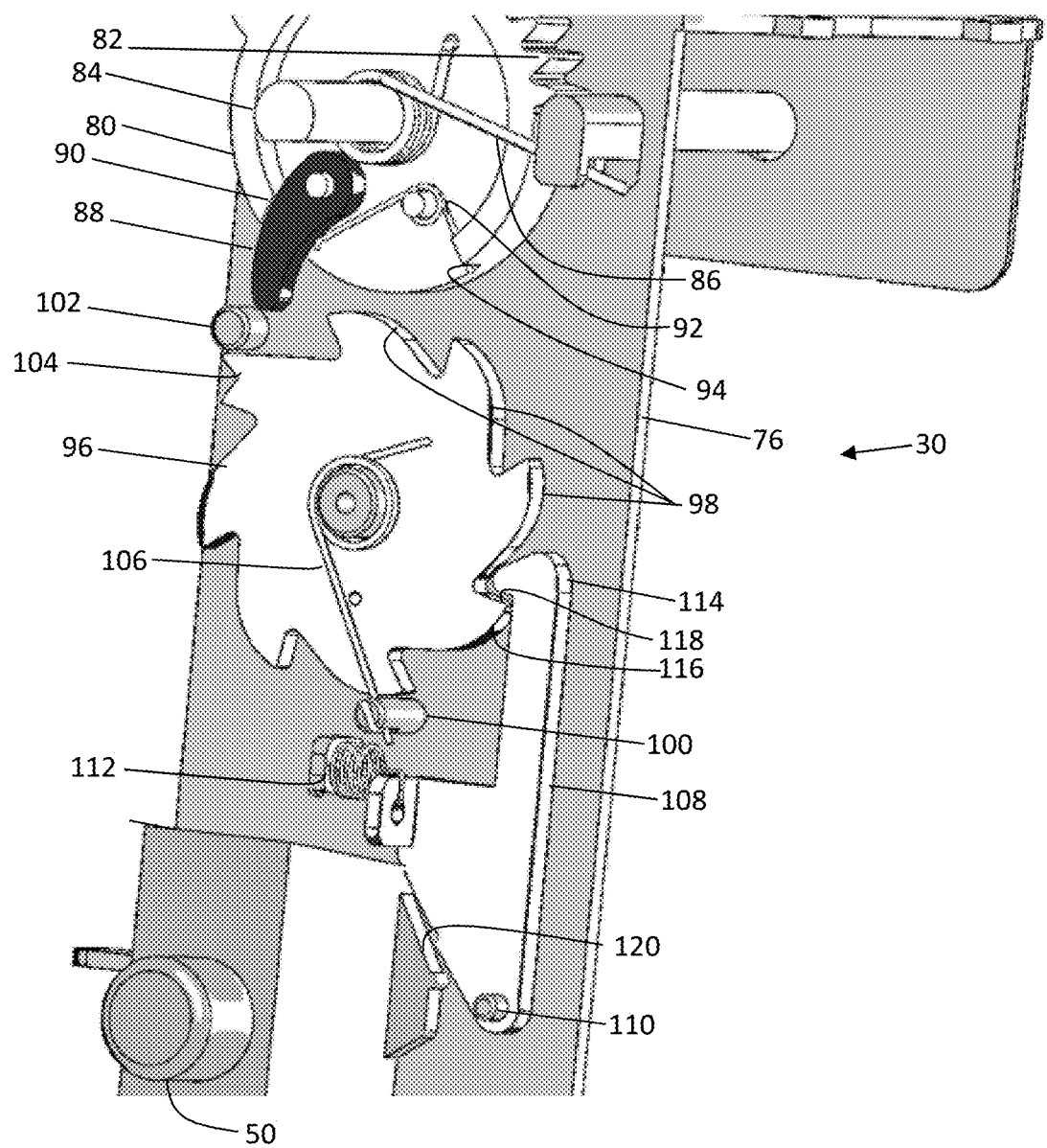
FIG. 5 is a partial perspective view showing additional detail of the dispensing assembly.

The dispensing assembly 30 further includes a counter 96. The counter 96 may comprise a wheel and may be pivotally connected to the frame 76 in a position where the counter may be engaged with the follower 88. The counter 96 may include a plurality of contact surfaces 98 arranged in a sequence. As shown in the drawings, the contact surfaces 98 comprise a plurality of teeth formed with equiangularly spacing about the outer periphery of the counter 96. The follower 88 is configured to engage the counter contact surfaces 98 in a manner so as to incrementally move the counter as described below. The counter 96 may be configured to move between first and second stops 100,102. As shown in FIG. 4, the counter 96 is engaged with the first stop 100. In FIG. 5, the counter 96 is engaged with the second stop 102. The counter 96 may be provided with a spur 104 that allows the counter to engage the first and second stops 100,102. For example, as shown in the drawings, the first and second counter stops 100,102 are pins projecting from a side of the frame 76. The counter 96 includes a spring 106 which urges the counter against the first stop 100. For example as shown in the drawings, a torsion spring 106 is provided around the pivot connection of the counter 96 with the frame 76 so as to urge the counter toward the first stop 100.

The dispensing mechanism may also comprise a latch 108. The latch 108 may be arranged to engage the contact surfaces 98 of the counter 96 to retain the counter in position as the counter incrementally moves between the first and second stops 100,102. The latch 108 may have a pivot connection 110 with the frame 76 and may move between engaged and disengaged positions with the counter 96. The latch 108 may include a spring 112 to urge the latch 108 into engagement with the counter 96. For instance, the latch 108 may be shaped at its distal end 114 and pivotally connected to the frame 76 such that as the contact surfaces 98 of the counter 96 pass by the latch distal end (for instance clockwise in the drawings), the leading edge 116 of the contact surface 98 may force the latch outward against pressure of the spring 112, until the trailing edge 118 of the contact surface passes by the latch at which point spring pressure will urge the latch inward to engage the trailing edge of the contact surface and retain the counter in a position between the first and second stops 100,102. A switch follower 120 associated with the power switch 50 for the popping unit is engageable with the latch 114. When the switch 50 is moved to the energizing position (for instance, up in the drawings), the switch follower 120 engages the latch 108 to pivot the latch away from contact with the counter contact surfaces 98. When the switch is moved to the de-energizing position (for instance, down in the drawings), the switch follower 120 disengages from the latch, and the spring 112 urges the latch 108 into contact with the counter.

During operation, the user may operate the lever 32 (for instance, turning it counter clockwise in the drawings) to move the drawer 68 from the receiving position to the dispensing position. The gear mesh 78,82 of the driver 80 and the drawer 68 enables the drawer to translate to the dispensing position allowing the contents of the drawer to deposited into the popping chamber 24 and/or onto the cooking surfaces 56,58. Once the user releases the lever 32, the torsion spring 86 of the driver 80 acts to urge the driver (clockwise rotation in the drawings) to move the drawer 68 from the dispensing position to the receiving position. As the user operates the lever 32 to move the driver from the receiving position to the dispensing position, the follower 88 moves against the driver stop 90 (in a counterclockwise manner in the drawings) to engage the trailing edge 118 of the contact surface 98 of the counter 96. This forces the counter 96 to rotate to the next incremental position between the first and second stops 100,102, for instance, in a clockwise direction off the first counter stop as shown in FIG. 4. To allow the follower 88 to reposition against the driver stop 90 when the driver moves between the dispensing position of the drawer and the receiving position of the drawer, the follower may contact the leading surfaces 116 of the counter contact surfaces 98 and pivot within the arcuate cutout 94 of the driver 80 against the pressure of the follower spring 94, thereby allowing the follower to clear the counter 86 after each cycle and to be in position to engage the counter contact surfaces 98 (e.g., the trailing edge 118) for the next cycle.

During rotation of the counter 96, the leading edge 116 of the contact surface 98 of the counter slides along the distal end of the latch 108. The pivoting action of the latch 108 allows the latch to move as necessary to accommodate the contact surfaces 98 of the counter 96. The latch spring 112 maintains the latch 108 in engagement with the counter 96 and allows the latch to retain the counter in position after the passing of the point of transition of the leading edge 116 of the contact surface to the trailing edge 118 of the contact surface. Successive engagement of the follower 88 with the counter 96, and the latch's engagement with the counter allows for the counter to move incrementally between the first and second counter stops 100,102. Once the counter spur 104 reaches the second counter stop 102, the lever 32 will be prevented from rotation until the latch 114 is disengaged from the counter 96 and the counter is repositioned against the first counter stop 100. When the power switch 50 is moved to the energized position, the switch follower 120 enables the latch 114 to disengage from the counter 96, thereby resetting the counter. This sequence of events and the number of contact surfaces on the counter allows for the contents deposited into the popping chamber and/or the cooking surfaces to be processed in the cooking cycle and prevents overfeeding of kernels.

The user may actuate the popping unit by depressing the switch 50. Depressing the switch activates the blower fan 38 and the heating element 42. Air is drawn in through the housing interior from the blower fan, passed over the heating element 42, and heated. The hot air passes over the cooking grate 56 and cooking surfaces 58, thereby cooking the kernels. The popped kernels expand through the popping chamber 24 out through the hood assembly 26 and into a serving dispenser. Once popping operations are complete, the user may de-energize the popping unit by actuating the switch 50. In embodiments where the popping unit has a timer, popping operations may be automatically completed upon expiration of the timer.

Figure 6:
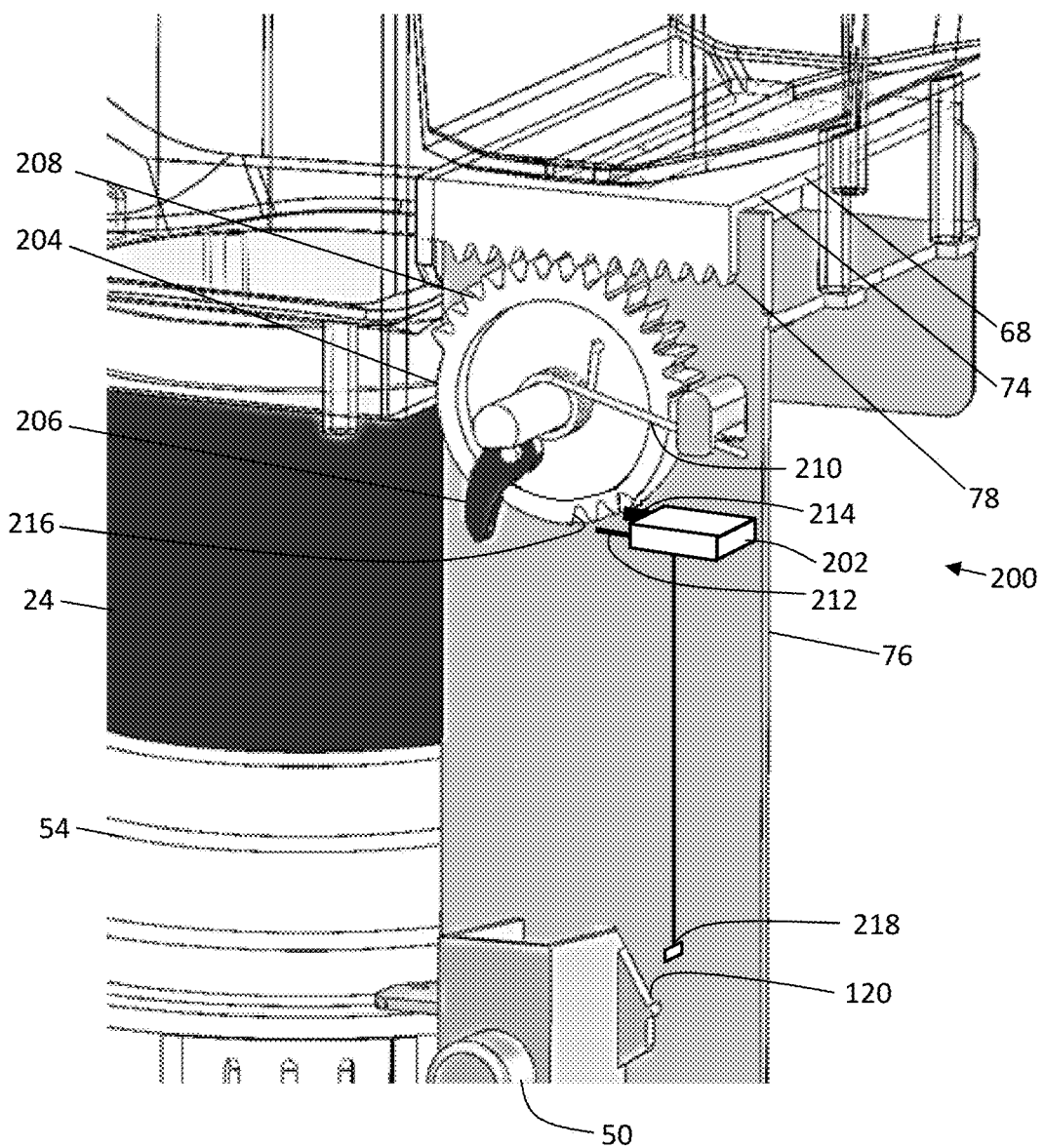
FIG. 6 is a partial perspective view showing an alternate embodiment of the dispensing assembly.

As an alternative to providing a dispensing assembly 30 with the counter 96 and the latch 108 as shown in FIGS. 2-5, the dispensing assembly 200 may be provided with an electronic counter 202. For instance, as shown in FIG. 6, the popping unit dispensing assembly 200 may include the drawer 68 as previously described and a driver 204 with a follower 206. The driver 204 may have gear teeth 208 configured to intermesh with the drawer gear rack 78. A spring 210 may be coupled between the driver 204 and the frame 76 so as to urge the driver to move the drawer 68 to the receiving position. The follower 206 may depend from the driver 204 in a manner to cooperate with the controller 202. The dispensing assembly controller 202 may have a switch 212 and a solenoid controlled stop 214. The switch 212 of the controller may be positioned to be engaged by the follower 206 when the driver is moved from the receiving position of the drawer to the dispensing position of the drawer. The follower 206 of the driver 204 may actuate the switch 212 after each cycle of the drawer 68 moving between the receiving position and the dispensing position, or after the driver returns from the dispensing position of the drawer to the receiving position of the drawer. For instance, the follower 206 may physically engage the switch 212 as the driver rotates 204 (for instance, counterclockwise in the drawings). The solenoid controlled stop 214 of the controller may be positionable between engaged and disengaged positions with the driver 204. A signal from the switch 212 may be received by the controller 202. When the controller 202 receives a preselected number of switch signals representative of the number of cycles of the drawer 68 moving between the receiving and dispensing positions, the controller 202 may actuate the solenoid stop 214 to move to the engaged position with the driver 204 to prevent further operation of the driver. The solenoid stop 214 may engage detents 216 of the driver 204 to mechanically lock the driver. The solenoid stop 214 may be engaged to prevent rotation of the driver 204 until the blower unit is energized. When the blower unit is energized, the switch follower 120 of power switch 50 may contact an input reset switch 218 that provides a signal to the controller 202 to move the solenoid stop 214 to the disengaged position and to reset the counter. Although the drawings show the controller with mechanical switches (212, 218), a non-physical or proximity switch may also be provided. Although the drawings show the controller with a solenoid stop engageable with the driver, in addition to or in the alternative, the solenoid stop may engage the drawer. Although the drawings show the controller with a switch cooperating with the follower of the driver, the switch may cooperate with the drawer.

While the drawings show a lever 32 configured to be operated manually by the user for rotating the axle and driver to affect motion of the drawer 68 between the receiving and dispensing positions, the lever 32 may be replaced with a motor (not shown) configured to drive the driver between the dispensing and receiving positions of the drawer. The motor may be interfaced with the controller 202 so that the controller prevents operation of the motor after a preselected number of cycles of movement of the drawer between the dispensing and receiving positions. The controller 202 may allow resetting of the counter upon energization of blower and activation of the power switch 50.

In view of the foregoing, it will be seen that the several advantages are achieved and attained. The embodiments were chosen and described in order to best explain a practical application to thereby enable others skilled in the art to best utilize the principles herein in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A hot air popcorn popper comprising
a heating element and a blower fan;
a cooking surface adapted to receive kernels of corn;
a popping chamber into which popcorn enters after being popped, the popping chamber having an inlet and an outlet, the popping chamber inlet being adjacent to the cooking surface, the popping chamber outlet being spaced from the popping chamber inlet;

a seed storage compartment configured to receive kernels of un-popped corn;

a dispenser configured to move between a receiving position and a dispensing position, in the receiving position, the dispenser receiving kernels of un-popped corn from the seed storage compartment, and in the dispensing position, the dispenser dispensing the received kernels of un-popped corn into the popping chamber;

a driver coupled to the dispenser and including means for moving the dispenser between the receiving position and the dispensing position;

a counter having a plurality of contact surfaces arranged in a sequence; and a follower coupled to the counter and including means to move the counter incrementally between a first stop and a second stop;

wherein when the dispenser moves between the dispensing position and the receiving position, the driver includes means to position the follower to engage one of the contact surfaces in the sequence and move the counter to a first position between the first stop and the second stop, and when the dispenser again moves between the dispensing position and the receiving position, the driver includes means to position the follower to engage another one of the contact surfaces in the sequence that follows the one of the contact surfaces in the sequence and move the counter to a second position between the first stop and the second stop.

2. The popper of claim 1 wherein the driver pivots via a shaft.

3. The popper of claim 2 wherein the shaft is operatively connected to a lever.

4. The popper of claim 1 wherein the driver is urged to move the dispenser toward the receiving position.

5. The popper of claim 1 wherein the contact surfaces of the counter comprise a plurality of teeth.

6. The popper of claim 1, further comprising a latch engageable with the contact surfaces.

7. The popper of claim 6, further comprising a switch follower movable between an energizing position in which contacts are closed to connect electrical power to the blower fan, and a de-energizing position in which contacts are opened to disconnect electrical power from the blower fan, the switch follower engaging the latch in the energized position in a manner such that the latch disengages from the counter.

8. The popper of claim 7 wherein the counter is urged toward the first stop.

9. The popper of claim 1 wherein the follower is urged away from the counter.

10. The popper of claim 1 wherein the counter includes a spur configured to engage the first and second stop.

11. A hot air popcorn popper comprising:
a heating element and a blower fan,
a cooking surface adapted to receive kernels of corn,
a popping chamber into which popcorn enters after being popped, the popping chamber having an inlet and an outlet, the popping chamber inlet being adjacent to the cooking surface, the popping chamber outlet being spaced from the popping chamber inlet;

a seed storage compartment configured to receive kernels of un-popped corn;

a dispenser being configured to move between a receiving position and a dispensing position, in the receiving position, the dispenser receiving kernels of un-popped corn from the seed storage compartment, and in the dispensing position, the dispenser dispensing the received kernels of un-popped corn onto the cooking surface;

a driver coupled to the dispenser and including means for moving the dispenser between the receiving position and the dispensing position;

a follower that moves with the driver as the driver moves the dispenser between the dispensing position and the receiving position;

a counter having a plurality of contact surfaces arranged in a sequence; and a latch configured to engage the counter and maintain the counter in one of a first position and a second position as the counter is incrementally moved between a first stop and a second stop;

wherein when the dispenser moves between the dispensing position and the receiving position, the driver includes means to position the follower to engage one of the contact surfaces in the sequence and move the counter to the first position between the first and second stops with the latch engaging the counter to retain the counter in the first position, and when the dispenser again moves between the dispensing position and the receiving position, the driver includes means to position the follower to engage another one of the contact surfaces in the sequence that follows the one of the contact surfaces in the sequence and move the counter to the second position between the first and second stops with the latch engaging the counter to retain the counter in the second position.

12. The popper of claim 11 wherein the dispenser comprises a gear rack.

13. The popper of claim 12 wherein the driver comprised a gear.

14. The popper of claim 11 wherein the driver is urged to move the dispenser toward the receiving position.

15. The popper of claim 11 wherein the contact surfaces of the counter comprise a plurality of teeth.

16. The popper of claim 11 wherein the counter includes a spur configured to engage the first and second stop.

17. The popper of claim 11 wherein the follower is urged away from the counter.

18. The popper of claim 11, wherein the counter is urged toward the first stop.

19. The popper of claim 18, wherein the latch is disengageable from the counter to allow the counter to move to the first stop.

20. The popper of claim 19, further comprising a switch follower movable between an energizing position in which contacts are closed to connect electrical power to the blower fan, and a de-energizing position in which contacts are opened to disconnect electrical power from the blower fan, the switch follower engaging the latch in the energized position in a manner such that the latch disengages from the counter.

* * * * *